United States Patent
Umino et al.

(10) Patent No.: US 11,306,172 B2
(45) Date of Patent: Apr. 19, 2022

(54) ACTIVE-ENERGY-RAY-CURABLE RESIN COMPOSITION AND METAL-THIN-FILM UNDERCOAT AGENT

(71) Applicant: DIC Corporation, Tokyo (JP)

(72) Inventors: Akio Umino, Ichihara (JP); Seiichi Uno, Ichihara (JP)

(73) Assignee: DIC Corporation, Tokyo (JP)

( * ) Notice: Subject to any disclaimer, the term of this patent is extended or adjusted under 35 U.S.C. 154(b) by 136 days.

(21) Appl. No.: 16/316,440

(22) PCT Filed: Jun. 29, 2017

(86) PCT No.: PCT/JP2017/023885
§ 371 (c)(1),
(2) Date: Jan. 9, 2019

(87) PCT Pub. No.: WO2018/012295
PCT Pub. Date: Jan. 18, 2018

(65) Prior Publication Data
US 2019/0225730 A1    Jul. 25, 2019

(30) Foreign Application Priority Data

Jul. 14, 2016    (JP) .............................. JP2016-139415

(51) Int. Cl.
| | |
|---|---|
| C08F 2/50 | (2006.01) |
| C09D 5/00 | (2006.01) |
| B32B 27/36 | (2006.01) |
| C08F 290/06 | (2006.01) |
| C09D 4/00 | (2006.01) |
| C09D 167/06 | (2006.01) |

(Continued)

(52) U.S. Cl.
CPC .......... *C08F 290/061* (2013.01); *B32B 27/36* (2013.01); *C08F 2/50* (2013.01); *C08F 290/06* (2013.01); *C08K 5/07* (2013.01); *C09D 4/00* (2013.01); *C09D 4/06* (2013.01); *C09D 5/00* (2013.01); *C09D 167/06* (2013.01); *G02B 5/08* (2013.01); *B32B 15/09* (2013.01)

(58) Field of Classification Search
CPC ...... C08F 290/061; C08F 290/06; C08F 2/50; C09D 5/00; C09D 4/06; C09D 167/06; G02B 6/08; B32B 5/08; B32B 15/09; C08K 5/07
See application file for complete search history.

(56) References Cited

U.S. PATENT DOCUMENTS 5,780,526 A * 7/1998 Matsui .................. C08J 7/0427
522/93
9,512,330 B2 * 12/2016 Umino ..................... C08F 2/46
(Continued)

FOREIGN PATENT DOCUMENTS

JP        56-69118 A      6/1981
JP        59-109564 A     6/1984
(Continued)

OTHER PUBLICATIONS

Matsunami et al., Machine English translation of JP 2003-026710 (Year: 2003).*
(Continued)

*Primary Examiner* — Jessica M Roswell
(74) *Attorney, Agent, or Firm* — Locke Lord LLP; James E. Armstrong, IV; Nicholas J. DiCeglie, Jr.

(57) ABSTRACT

An active energy ray-curable resin composition which is excellently adhesive to a base material, an undercoat agent which is for a metal thin film and includes the resin composition, and a formed material obtained using the undercoat agent for a metal thin film are provided. The active energy ray-curable resin composition includes, as essential components, an alkyd resin (A), an unsaturated bond-containing polymerizable compound (B), a phenolic compound (C) represented by the following structural formula (1)

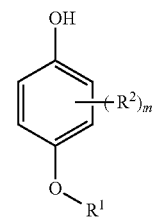

(1)

wherein $R^1$ is a hydrogen atom or a hydrocarbon group), and a photopolymerization initiator (D) having a structural moiety represented by the following structural formula (2)

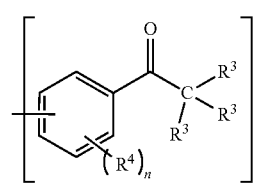

(2)

wherein $R^3$'s are any of an aliphatic hydrocarbon group, an aryl group, an aralkyl group, an alkoxy group, a hydroxyl group and an amino group, wherein two or more of the $R^3$'s may form a ring structure.

6 Claims, No Drawings

(51) Int. Cl.
  *G02B 5/08*  (2006.01)
  *C08K 5/07*  (2006.01)
  *C09D 4/06*  (2006.01)
  *B32B 15/09* (2006.01)

(56) References Cited

U.S. PATENT DOCUMENTS

| | | | |
|---|---|---|---|
| 10,829,579 B2 * | 11/2020 | Umino | C09D 133/26 |
| 2007/0003866 A1 * | 1/2007 | Takamuki | G03F 7/0757 |
| | | | 430/270.1 |
| 2015/0361298 A1 * | 12/2015 | Umino | C09D 173/00 |
| | | | 522/170 |

FOREIGN PATENT DOCUMENTS

| | | |
|---|---|---|
| JP | 01-113402 A | 5/1989 |
| JP | 03-039373 A | 2/1991 |
| JP | 10-212328 A | 8/1998 |
| JP | 11-246635 A | 9/1999 |
| JP | 2001-163930 A | 6/2001 |
| JP | 2003-026710 A | 1/2003 |
| JP | 2003-221408 A | 8/2003 |
| WO | 2003/066759 A1 | 8/2003 |

OTHER PUBLICATIONS

Kitani et al., Machine English translation of JP S61287918 (Year: 1986).*

Umino et al., Machine English translation of JP 2012-067162 (Year: 2012).*

International Search Report dated Sep. 26, 2017, issued for PCT/JP2017/023885.

* cited by examiner

ACTIVE-ENERGY-RAY-CURABLE RESIN COMPOSITION AND METAL-THIN-FILM UNDERCOAT AGENT

TECHNICAL FIELD

The present invention relates to an active energy ray-curable resin composition which is excellently adhesive to a base material, an undercoat agent which is for a metal thin film and includes the resin composition, and a formed material obtained using the undercoat agent for a metal thin film.

BACKGROUND ART

A technique for forming a thin film of a metal such as aluminum or tin by a method such as vacuum evaporation or sputtering is widely used for parts with metallic luster in automotive parts, household appliances, cosmetic containers and the like. In this technique, an undercoat layer is generally provided between a base material and a metal thin film for the purpose of improving the adhesiveness between the base material and the metal thin film or forming a smoother metal thin film to improve the design or for another purpose.

Of the automotive parts, for parts which are required to have high heat resistance and high impact resistance and which is required to be lighter, such as a reflex mirror of an exterior lamp lens, a plastic base material such as BMC (bulk molding compound), PPS (polyphenylene sulfide), ALD (die cast aluminum), a PBT (polybutylene terephthalate)/PET (polyethylene terephthalate) alloy resin, PC (polycarbonate), ABS (acrylonitrile-butadiene-styrene copolymer resin) and PC (polycarbonate) reinforced with a filler such as glass fibers is widely used as the base material. Some parts of the automotive parts, the household appliances and the like have two or more types of base material in combination or have a complicated uneven shape. Accordingly, it is required that the adhesiveness of the undercoat layer both to the various kinds of plastic base material and to the metal thin film is excellent and that the undercoat layer has flexibility to conform to a complicated shape.

As an example of such an undercoat layer for a metal thin film, a technique related to an ultraviolet-curable resin composition containing an alkyd resin and a polyacrylate compound in which benzophenone and isoamyl dimethylaminobenzoate are used in combination as photopolymerization initiators and in which monotertiarybutyl hydroquinone is used as a polymerization inhibitor is known (see PTL 1). Although the ultraviolet-curable resin composition described in PTL 1 has characteristics of excellent storage stability, which has been a challenge of a composition of an alkyd resin and a polyacrylate compound, the adhesiveness to a base material is not sufficient, and further improvement in the adhesiveness to a base material especially under a high-temperature condition has been desired.

CITATION LIST

Patent Literature

PTL 1: JP-A-2003-221408

SUMMARY OF INVENTION

Technical Problem

Therefore, a problem that the invention is to solve is to provide an active energy ray-curable resin composition which is excellently adhesive to abase material, an undercoat agent which is for a metal thin film and includes such a resin composition, and a formed material obtained using such an undercoat agent for a metal thin film.

Solution to Problem

As a result of extensive investigation to solve the problem, the present inventors have found that the adhesiveness of an active energy ray-curable resin composition containing an alkyd resin and a polymerizable compound having an unsaturated bond in its molecular structure to a base material can be improved significantly by adding a phenolic compound having a specific structure to the composition and using a compound having a specific structure as a photopolymerization initiator in the composition. The invention has been thus completed.

Specifically, the invention relates to an active energy ray-curable resin composition including as essential components: an alkyd resin (A); an unsaturated bond-containing polymerizable compound (B); a phenolic compound (C) represented by the following structural formula (1)

[Chem. 1]

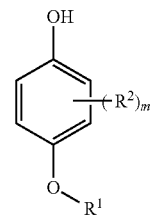

(1)

wherein $R^1$ is a hydrogen atom or a hydrocarbon group, $R^2$'s each independently represent a hydrocarbon group, an alkoxy group or a halogen atom, and m is 0 or an integer of 1 to 4; and a photopolymerization initiator (D) having a structural moiety represented by the following structural formula (2)

[Chem. 2]

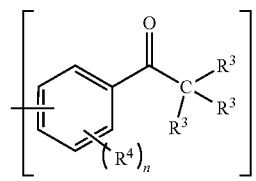

(2)

wherein $R^3$'s are any of an aliphatic hydrocarbon group, an aryl group, an aralkyl group, an alkoxy group, a hydroxyl group and an amino group, wherein two or more of the $R^3$'s may form a ring structure, $R^4$'s each independently represent a hydrocarbon group, an alkoxy group or a halogen atom, and n is 0 or an integer of 1 to 5.

The invention further relates to an undercoat agent that is for a metal thin film and includes the active energy ray-curable resin composition.

The invention further relates to a coating made from the undercoat agent for a metal thin film.

The invention further relates to a formed material having an undercoat layer made from the undercoat agent for a metal thin film.

Advantageous Effects of Invention

The invention makes it possible to provide an active energy ray-curable resin composition which is excellently adhesive to a base material, an undercoat agent which is for a metal thin film and includes such a resin composition, and a formed material obtained using such an undercoat agent for a metal thin film.

DESCRIPTION OF EMBODIMENTS

The active energy ray-curable resin composition of the invention includes, as essential components, an alkyd resin (A); an unsaturated bond-containing polymerizable compound (B); a phenolic compound (C) represented by the following structural formula (1)

[Chem. 3]

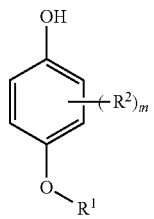

(1)

wherein $R^1$ is a hydrogen atom or a hydrocarbon group, $R^2$'s each independently represent a hydrocarbon group, an alkoxy group or a halogen atom, and m is 0 or an integer of 1 to 4); and a photopolymerization initiator (D) having a structural moiety represented by the following structural formula (2)

[Chem. 4]

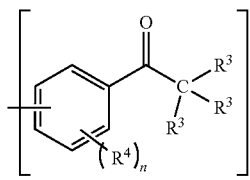

(2)

wherein $R^3$'s are any of an aliphatic hydrocarbon group, an aryl group, an aralkyl group, an alkoxy group, a hydroxyl group and an amino group, wherein two or more of the $R^3$'s may form a ring structure, $R^4$'s each independently represent a hydrocarbon group, an alkoxy group or a halogen atom, and n is 0 or an integer of 1 to 5.

The alkyd resin (A) is a polyester resin obtained using a polybasic acid (a1), a polyhydric alcohol (a2) and an oil, fat or fatty acid (a3) as essential components.

Examples of the polybasic acid (a1) include aliphatic dibasic acids such as malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid and icosanedioic acid; aliphatic unsaturated dibasic acids or anhydrides thereof such as tetrahydrophthalic acid, maleic acid, maleic anhydride, fumaric acid, citraconic acid, itaconic acid and glutaconic acid; alicyclic dibasic acids such as hexahydrophthalic acid and 1,4-cyclohexanedicarboxylic acid; aromatic dibasic acids or anhydrides thereof such as phthalic acid, phthalic anhydride, terephthalic acid, isophthalic acid and orthophthalic acid; aliphatic tribasic acids such as 1,2,5-hexanetricarboxylic acid and 1,2,4-cyclohexanetricarboxylic acid; aromatic tribasic acids or anhydrides thereof such as trimellitic acid, trimellitic anhydride, 1,2,5-benzenetricarboxylic acid and 2,5,7-naphthalenetricarboxylic acid; and the like. One kind thereof may be used alone, or a combination of two or more kinds thereof may be used.

To adjust the molecular weight of the obtained alkyd resin (A) for example, a monobasic acid such as methanoic acid, ethanoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, benzoic acid, para-tertiary-butylbutylbenzoic acid and rosin may also be used in addition to the polybasic acid (a1). One kind thereof may be used alone, or a combination of two or more kinds thereof may be used. Of these monobasic acids, a monobasic acid having a cyclic structure such as benzoic acid or rosin is preferably used because a cured coating of the obtained active energy ray-curable resin composition has excellent heat resistance and toughness.

Examples of the polyhydric alcohol (a2) include diols such as ethylene glycol, diethylene glycol, propylene glycol, dipropylene glycol, 1,3-propanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl 1,5-pentanediol, neopentyl glycol, 1,6-hexanediol, 1,4-bis(hydroxymethyl)cyclohexane and 2,2,4-trimethyl-1,3-pentanediol; polyols such as trimethylolethane, trimethylolpropane, glycerin, hexanetriol and pentaerythritol; modified polyether polyols obtained by ring-opening polymerization of any of the diols and the polyols and a cyclic ether linkage-containing compound such as ethylene oxide, propylene oxide, tetrahydrofuran, ethyl glycidyl ether, propyl glycidyl ether, butyl glycidyl ether, phenyl glycidyl ether and allyl glycidyl ether; lactone-based polyester polyols obtained by polycondensation reaction of any of the diols and the polyols and a lactone such as ε-caprolactone; and the like. One kind thereof may be used alone, or a combination of two or more kinds thereof may be used. Of these examples, a polyol such as trimethylolethane, trimethylolpropane, glycerin, hexanetriol and pentaerythritol or a modified polyol thereof is preferably used because a cured coating of the obtained active energy ray-curable resin composition has excellent heat resistance and toughness.

Examples of the oil, fat or fatty acid (a3) include oils and fats such as linseed oil, tung oil, rice oil, safflower oil, soybean oil, tall oil, rapeseed oil, palm oil, castor oil, dehydrated castor oil and coconut oil; fatty acids derived from the oils and fats; recovered oils and fats thereof; higher fatty acids having 12 to 30 carbon atoms such as oleic acid, linoleic acid, linolenic acid, arachidonic acid and docosahexaenoic acid; and the like. One kind thereof may be used alone, or a combination of two or more kinds thereof may be used. Of these examples, an oil or fat having an iodine value of 100 or more, specifically any of tung oil, linseed oil, dehydrated castor oil, soybean oil, safflower oil and tall oil is preferably used because an active energy ray-curable resin composition which is excellently adhesive to various kinds of plastic base material is obtained, and a combination of two or more kinds of the oils and fats having an iodine value of 100 or more is more preferably used.

The alkyd resin (A) may be a urethane-modified alkyd resin obtained by reaction of the components (a1) to (a3) and a polyisocyanate compound (a4). Examples of the polyisocyanate compound used here include aliphatic diisocyanates such as butane-1,4-diisocyanate, hexamethylene diisocyanate, 2,2,4-trimethylhexamethylene diisocyanate, 2,4,4-trimethylhexamethylene diisocyanate, xylylene diisocyanate and m-tetramethylxylylene diisocyanate;

alicyclic diisocyanates such as cyclohexane-1,4-diisocyanate, isophorone diisocyanate, lysine diisocyanate, dicyclohexylmethane-4,4'-diisocyanate, 1,3-bis(isocyanatomethyl)cyclohexane and methylcyclohexane diisocyanate;

aromatic diisocyanates such as 1,5-naphthylene diisocyanate, 4,4'-diphenylmethane diisocyanate, 4,4'-diphenyldimethylmethane diisocyanate, 4,4'-dibenzyl diisocyanate, dialkyldiphenylmethane diisocyanates, tetraalkyldiphenylmethane diisocyanates, 1,3-phenylene diisocyanate, 1,4-phenylene diisocyanate and tolylene diisocyanate;

nurate-modified polyisocyanates of the diisocyanates; adduct-modified polyisocyanates obtained by reaction of any of the diisocyanates and a polyol; biuret-modified polyisocyanates of the diisocyanates; and the like. One kind thereof may be used alone, or a combination of two or more kinds thereof may be used.

The alkyd resin (A) may be a phenol-modified alkyd resin obtained by reaction of the components (a1) to (a3) and a phenolic resin (a5). The phenolic resin used here is a resol-type phenolic resin or a novolac-type phenolic resin.

The alkyd resin (A) may be an acryl-modified alkyd resin obtained by reaction of the components (a1) to (a3) and an unsaturated bond-containing polymerizable monomer (a6). Examples of the unsaturated bond-containing polymerizable monomer (a6) include aliphatic (meth)acrylate monomers such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate and nonyl (meth)acrylate;

alicyclic (meth)acrylate monomers such as cyclohexyl (meth)acrylate, isobornyl (meth)acrylate, dicyclopentanyl (meth)acrylate and adamantyl mono(meth)acrylate;

heterocyclic (meth)acrylate monomers such as glycidyl (meth)acrylate and tetrahydrofurfuryl acrylate;

aromatic (meth)acrylate monomers such as phenyl (meth)acrylate, benzyl (meth)acrylate, phenoxy (meth)acrylate and phenoxyethyl acrylate;

hydroxyl group-containing (meth)acrylate monomers such as hydroxyethyl (meth)acrylate, hydroxypropyl (meth)acrylate and hydroxybutyl acrylate;

carboxy group-containing (meth)acrylate monomers such as (meth)acrylic acid, (acryloyloxy)acetic acid, 2-carboxyethyl acrylate and 3-carboxypropyl acrylate;

silyl group-containing (meth)acrylate monomers such as 3-methacryloxypropyltrimethoxysilane;

aminoalkyl (meth)acrylate monomers such as N, N-dimethylaminoethyl (meth)acrylate, N, N-diethylaminoethyl (meth)acrylate and N, N-diethylaminopropyl (meth)acrylate; (per)fluoroalkyl (meth)acrylate monomers such as 2,2,2-trifluoroethyl (meth)acrylate, 2,2,3,3-tetrafluoropropyl (meth)acrylate, 1H,1H,5H-octafluoropentyl (meth)acrylate, 1H,1H,2H,2H-heptadecafluorodecyl (meth)acrylate and perfluoroethyloxyethyl (meth)acrylate;

(per) fluoroalkyl.perfluorovinyl ethers in which the carbon atom number of the (per) fluoroalkyl group is in the range of 1 to 18 such as trifluoromethyl trifluorovinyl ether, pentafluoroethyl trifluorovinyl ether and heptafluoropropyl trifluorovinyl ether;

unsaturated dicarboxylic acid esters such as dimethyl fumarate, diethyl fumarate, dibutyl fumarate, dimethyl itaconate, dibutyl itaconate, methylethyl fumarate, methylbutyl fumarate and methylethyl itaconate;

aromatic vinyl monomers such as styrene, α-methylstyrene and chlorostyrene;

diene-based compounds such as butadiene, isoprene, piperylene and dimethylbutadiene;

vinyl halides such as vinyl chloride and vinyl bromide or vinylidene halides;

unsaturated ketones such as methyl vinyl ketone and butyl vinyl ketone;

vinyl esters such as vinyl acetate and vinyl butyrate;

vinyl ethers such as methyl vinyl ether and butyl vinyl ether;

vinyl cyanides such as acrylonitrile, methacrylonitrile and vinylidene cyanide;

acrylamide or alkyd-substituted amides thereof;

N-substituted maleimides such as N-phenylmaleimide and N-cyclohexylmaleimide;

fluorine-containing α-olefins such as vinyl fluoride, vinylidene fluoride, trifluoro ethylene, chlorotrifluoro ethylene, bromotrifluoro ethylene, pentafluoro propylene and hexafluoro propylene; and the like. One kind thereof may be used alone, or a combination of two or more kinds thereof may be used.

Of these examples, any of the hydroxyl group-containing (meth)acrylate monomers is preferably used as an essential component because an alkyd resin (A) which is excellently adhesive to various kinds of base material is obtained. The proportion of the hydroxyl group-containing (meth)acrylate monomer in the unsaturated bond-containing polymerizable monomer (a6) here is preferably in the range of 5 to 50% by mass, more preferably in the range of 5 to 30% by mass.

Moreover, any of the aromatic vinyl monomers is preferably used as an essential component because an alkyd resin (A) having excellent heat resistance is obtained. The proportion of the aromatic vinyl monomer in the unsaturated bond-containing polymerizable monomer (a6) here is preferably in the range of 5 to 50% by mass, more preferably in the range of 10 to 40% by mass.

The method for producing the alkyd resin (A) is not particularly limited, and the alkyd resin (A) may be produced by any method. For example, when the alkyd resin is produced from the polybasic acid (a1), the polyhydric alcohol (a2), the oil, fat or fatty acid (a3) and if necessary, the monobasic acid as raw materials, a method of reacting all the components together at a temperature of around 120 to 300° C. is preferable. When a urethane-modified alkyd resin is produced, it is preferable to react the basic acid (a1), the polyhydric alcohol (a2), the oil, fat or fatty acid (a3) and if necessary, the monobasic acid at a temperature of around 120 to 300° C., then add the polyisocyanate compound (a4) and react the mixture at a temperature of around 50 to 100° C. When a phenol-modified alkyd resin is produced, a method of reacting all the polybasic acid (a1), the polyhydric alcohol (a2), the oil, fat or fatty acid (a3), the phenolic resin (a5) and if necessary, the monobasic acid together at a temperature of around 120 to 300° C. is preferable. The progress of the reaction can be monitored by measuring the amount of water generated in the dehydration reaction, the acid value, the hydroxyl value or the amount of remaining isocyanate groups. If necessary, an esterification catalyst, a urethanization catalyst or the like may be appropriately used. When an acryl-modified alkyd resin is produced, a method of reacting the basic acid (a1), the polyhydric alcohol (a2), the oil, fat or fatty acid (a3) and if necessary, the monobasic acid at a temperature of around 120 to 300° C., then heating the resultant to around 70 to 150° C. in an environment with a nitrogen flow and continuously or intermittently adding a mixture of the unsaturated bond-containing polymerizable monomer (a6) and an acrylic polymerization catalyst to cause polymerization reaction is preferable.

The alkyd resin (A) may be reacted in an organic solvent if necessary. Moreover, the viscosity, the amount of a nonvolatile component or the like may be adjusted by adding an organic solvent after the reaction. Examples of the organic solvent include ketone solvents such as acetone, methyl ethyl ketone (MEK) and methyl isobutyl ketone, cyclic ether solvents such as tetrahydrofuran (THF) and dioxolane, ester solvents such as methyl acetate, ethyl acetate and butyl acetate, aromatic hydrocarbon solvents such as toluene, xylene and Solvesso and alcohol solvents such as Carbitol, Cellosolve, methanol, isopropanol, butanol and propylene glycol monomethyl ether. One kind thereof may be used alone, or a combination of two or more kinds thereof may be used.

The oil length of the alkyd resin (A) is preferably in the range of 30 to 70 because an active energy ray-curable resin composition which is excellently adhesive to various kinds of plastic base material and which has excellent heat resistance, toughness and the like is obtained. The weight-average molecular weight (Mw) is preferably in the range of 50,000 to 700,000, and the molecular weight distribution (Mw/Mn) is preferably in the range of 2 to 200. Moreover, the hydroxyl value is preferably in the range of 25 to 200 mg KOH/g, and the acid value is preferably 40 mg KOH/g or less.

The oil length of the alkyd resin (A) is the mass ratio of the oil, fat or fatty acid (a3) to the total mass of the resin materials of the alkyd resin (A) as a percentage. In the invention, the weight-average molecular weight (Mw) and the molecular weight distribution (Mw/Mn) are values measured by gel permeation chromatography (GPC) under the following conditions.

Measurement Device: HLC-8320GPC manufactured by Tosoh Corporation

Columns: TSKgel 4000HXL, TSKgel 3000HXL, TSKgel 2000HXL and TSKgel 1000HXL manufactured by Tosoh Corporation Detector: RI (differential refractometer) Data Processing: multi-station GPC-8020 model II manufactured by Tosoh Corporation Measurement Conditions: column temperature of 40° C., tetrahydrofuran as solvent and flow rate of 0.35 ml/minute Standard: monodisperse polystyrene Sample: prepared by filtering a 0.2% (in terms of solid resin content) tetrahydrofuran solution through a microfilter (100 µl)

The unsaturated bond-containing polymerizable compound (B) is a (meth)acrylate monomer (B1), a urethane (meth)acrylate (B2), an epoxy (meth)acrylate (B3), a compound (B4) having an unsaturated bond other than a (meth)acryloyl group or the like.

Examples of the (meth)acrylate monomer (B1) include aliphatic mono(meth)acrylate compounds such as methyl (meth)acrylate, ethyl (meth)acrylate, propyl (meth)acrylate and butyl (meth)acrylate; alicyclic mono(meth)acrylate compounds such as cyclohexyl (meth)acrylate, isobornyl (meth)acrylate and adamantyl mono(meth)acrylate; heterocyclic mono(meth)acrylate compounds such as glycidyl (meth)acrylate and tetrahydrofurfuryl acrylate; aromatic mono(meth)acrylate compounds such as benzyl (meth)acrylate and phenoxy (meth)acrylate; hydroxyl group-containing mono(meth)acrylate compounds such as hydroxyethyl (meth)acrylate and hydroxypropyl (meth)acrylate; polyoxyalkylene-modified mono(meth)acrylate compounds obtained by introducing a polyoxyalkylene chain such as a polyoxyethylene chain, a polyoxypropylene chain or a polyoxytetramethylene chain into the molecular structures of the mono(meth)acrylate compounds; lactone-modified mono (meth)acrylate compounds obtained by introducing a (poly) lactone structure into the molecular structures of the mono (meth)acrylate compounds;

aliphatic di(meth)acrylate compounds such as (poly)ethylene glycol di(meth)acrylate, (poly) propylene glycol di(meth)acrylate, butanediol di(meth)acrylate, hexanediol di(meth)acrylate and neopentyl glycol di(meth)acrylate; alicyclic di(meth)acrylate compounds such as norbornane di(meth)acrylate, norbornane dimethanol di(meth)acrylate, dicyclopentanyl di(meth)acrylate and tricyclodecane dimethanol di(meth)acrylate; aromatic di(meth)acrylate compounds such as biphenol di(meth)acrylate and bisphenol di(meth)acrylate; polyoxyalkylene-modified di(meth)acrylate compounds obtained by introducing a polyoxyalkylene chain such as a polyoxyethylene chain, a polyoxypropylene chain or a polyoxytetramethylene chain into the molecular structures of the di(meth)acrylate compounds; lactone-modified di(meth)acrylate compounds obtained by introducing a (poly)lactone structure into the molecular structures of the di(meth)acrylate compounds;

aliphatic tri(meth)acrylate compounds such as trimethylolpropane tri(meth)acrylate and glycerin tri(meth)acrylate; hydroxyl group-containing tri(meth)acrylate compounds such as pentaerythritol tri(meth)acrylate, ditrimethylolpropane tri(meth)acrylate and dipentaerythritol tri(meth)acrylate;

polyoxyalkylene-modified tri(meth)acrylate compounds obtained by introducing a polyoxyalkylene chain such as a polyoxyethylene chain, a polyoxypropylene chain or a polyoxytetramethylene chain into the molecular structures of the tri(meth)acrylate compounds; lactone-modified tri(meth) acrylate compounds obtained by introducing a (poly)lactone structure into the molecular structures of the tri(meth)acrylate compounds;

aliphatic poly(meth)acrylate compounds having four or more functional groups such as pentaerythritol tetra(meth) acrylate, ditrimethylolpropane tetra(meth)acrylate and dipentaerythritolhexa(meth)acrylate; hydroxyl group-containing poly(meth)acrylate compounds having four or more functional groups such as dipentaerythritol tetra(meth)acrylate and dipentaerythritolpenta(meth)acrylate;

polyoxyalkylene-modified poly (meth)acrylate compounds having four or more functional groups obtained by introducing a polyoxyalkylene chain such as a polyoxyethylene chain, a polyoxypropylene chain or a polyoxytetramethylene chain into the molecular structures of the poly (meth)acrylate compounds; lactone-modified poly (meth) acrylate compounds having four or more functional groups obtained by introducing a (poly) lactone structure into the molecular structures of the poly(meth)acrylate compounds; and the like.

An example of the urethane (meth)acrylate compound (B2) is a compound obtained by reacting a polyisocyanate compound, a hydroxyl group-containing (meth)acrylate compound and if necessary, a polyol compound. Examples of the polyisocyanate compound include diisocyanate compounds such as hexamethylene diisocyanate, isophorone diisocyanate, tolylene diisocyanate, xylylene diisocyanate and 4,4′-diphenylmethane diisocyanate, nurate-modified compounds thereof, adduct-modified compounds thereof and biuret-modified compounds thereof. Examples of the hydroxyl group-containing (meth)acrylate compounds include hydroxyethyl (meth)acrylate, hydroxypropyl (meth) acrylate, trimethylolpropane diacrylate, pentaerythritol tri (meth)acrylate, dipentaerythritol penta (meth)acrylate, polyoxyalkylene-modified compounds thereof, polylactone-modified compounds thereof and the like. Examples of the polyol compound include ethylene glycol, propylene glycol, butanediol, hexanediol, polyoxyethylene glycol, polyoxypropylene glycol, glycerin, trimethylolpropane, pentaerythritol and the like.

The epoxy (meth)acrylate compound (B3) is a bisphenol-type epoxy resin or a (meth)acrylate ester of an epoxy group-containing compound such as trimethylolpropane triglycidyl ether.

Examples of the compound (B4) having an unsaturated bond other than a (meth)acryloyl group include diallyl fumarate, triallyl isocyanurate and the like.

One of the examples of the unsaturated bond-containing polymerizable compound (B) may be used alone, or a combination of two or more kinds thereof may be used. Because the curability is excellent and because the heat resistance and the surface smoothness of the obtained undercoat agent for a metal thin film are excellent, the (meth) acrylate monomer (B1) is preferable of the examples, and a (meth)acrylate compound having three or more functional groups is more preferable. Moreover, because the adhesive property to various kinds of base material is excellent and because the heat resistance and the surface smoothness of the obtained undercoat agent for a metal thin film are excellent, the urethane (meth)acrylate compound (B2) is preferable.

In the active energy ray-curable resin composition of the invention, the ratio of the alkyd resin (A) and the unsaturated bond-containing polymerizable compound (B) can be adjusted to any ratio depending on the desired properties, but the mass ratio [(A)/(B)] is preferably in the range of 20/80 to 80/20 because an active energy ray-curable resin composition which is excellently adhesive to various kinds of plastic base material and which has excellent heat resistance, toughness and the like is obtained.

In 100 parts by mass of the total solid resin content of the active energy ray-curable resin composition, the alkyd resin (A) and the unsaturated bond-containing polymerizable compound (B) are contained in a total amount of preferably 65 parts by mass or more, more preferably 70 parts by mass or more, particularly preferably 80 parts by mass or more.

The phenolic compound (C) has a molecular structure represented by the following structural formula (1).

[Chem. 5]

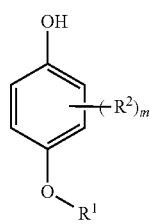

(1)

In the formula, $R^1$ is a hydrogen atom or a hydrocarbon group. $R^2$'s each independently represent a hydrocarbon group, an alkoxy group or a halogen atom, and m is 0 or an integer of 1 to 4.

$R^1$ in the structural formula (1) is a hydrogen atom or a hydrocarbon group. Examples of the hydrocarbon group include aliphatic hydrocarbon groups such as methyl group, ethyl group, vinyl group, propyl group, butyl group, pentyl group, hexyl group, cyclohexyl group, heptyl group, octyl group and nonyl group; aryl groups such as phenyl group, naphthyl group and anthryl group; aralkyl groups such as phenylmethyl group, phenylethyl group, naphthylmethyl group and naphthylethyl group; and the like. $R^1$ is preferably a hydrogen atom or an aliphatic hydrocarbon group of these examples because the effect of providing excellent adhesiveness to the base material is particularly strong. The carbon atom number of the aliphatic hydrocarbon group is more preferably in the range of 1 to 6.

$R^2$'s in the structural formula (1) are each independently a hydrocarbon group, an alkoxy group or a halogen atom. Examples of the hydrocarbon group include aliphatic hydrocarbon groups such as methyl group, ethyl group, vinyl group, propyl group, butyl group, pentyl group, hexyl group, cyclohexyl group, heptyl group, octyl group and nonyl group; aryl groups such as phenyl group, naphthyl group and anthryl group; aralkyl groups such as phenylmethyl group, phenylethyl group, naphthylmethyl group and naphthylethyl group; and the like. Examples of the alkoxy group include methoxy group, ethoxy group, propyloxy group, butoxy group and the like. The halogen atom is fluorine atom, chlorine atom or bromine atom. Of these examples, it is preferable that m is 0, or it is preferable that m is 1 and that $R^2$ is an aliphatic hydrocarbon group, because the effect of providing excellent adhesiveness to the base material is particularly strong. The carbon atom number of the aliphatic hydrocarbon group is more preferably in the range of 1 to 6.

Because the effect of providing excellent adhesiveness to the base material is particularly strong, any of the following compounds is particularly preferable of compounds represented by the structural formula (1): hydroquinone, in which m is 0, and $R^1$ is a hydrogen atom; para-methoxyphenol, in which m is 0, and $R^1$ is a methyl group; methylhydroquinone, in which $R^1$ is a hydrogen atom, $R^2$ is a methyl group, and m is 1; and tertiarybutylhydroquinone, in which $R^1$ is a hydrogen atom, $R^2$ is a tertiary butyl group, and m is 1.

The amount of the phenolic compound (C) in the active energy ray-curable resin composition is preferably in the range of 0.001 to 5 parts by mass based on 100 parts by mass of the solid resin content of the active energy ray-curable resin composition because the effect of providing excellent adhesiveness to the base material is sufficiently exhibited.

The photopolymerization initiator (D) has a structural moiety represented by the following structural formula (2).

[Chem. 6]

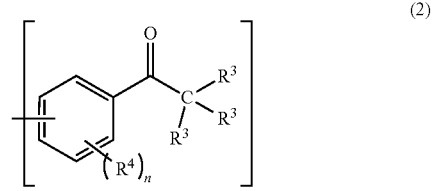

(2)

In the formula, $R^3$'s are any of an aliphatic hydrocarbon group, an aryl group, an aralkyl group, an alkoxy group, a hydroxyl group and an amino group, and two or more of the $R^3$'s may form a ring structure. $R^4$'s each independently represent a hydrocarbon group, an alkoxy group or a halogen atom, and n is 0 or an integer of 1 to 5.

$R^3$'s in the structural formula (2) are any of an aliphatic hydrocarbon group, an aryl group, an aralkyl group, an alkoxy group, a hydroxyl group and an amino group, and two or more of the $R^3$'s may form a ring structure. Examples of the aliphatic hydrocarbon group include methyl group, ethyl group, vinyl group, propyl group, butyl group, pentyl group, hexyl group, cyclohexyl group, heptyl group, octyl group, nonyl group and the like. Examples of the aryl group include phenyl group, naphthyl group, anthryl group, structural moieties of these aryl groups in which the aromatic nucleus is substituted with any of the aliphatic hydrocarbon groups, the alkoxy groups, the halogen atoms and the like and the like. Examples of the aralkyl group include phenylmethyl group, phenylethyl group, naphthylmethyl group, naphthylethyl group, structural moieties of these aralkyl groups in which the aromatic nucleus is substituted with any of the aliphatic hydrocarbon groups, the alkoxy groups, the halogen atoms and the like and the like. Examples of the alkoxy group include methoxy group, ethoxy group, propyloxy group, butoxy group and the like. Examples of the amino group include amino group, dialkylamino groups such as dimethylamino group, cyclic amino groups such as piperidinyl group and morpholinyl group and the like. When two or more of the $R^3$'s form a ring structure, examples of the ring structure include cyclopentane ring, cyclohexane ring and the like.

$R^4$'s in the structural formula (2) are each independently a hydrocarbon group, an alkoxy group or a halogen atom, and examples of the groups and the atom are those which are described as examples of $R^2$'s in the structural formula (1).

A compound represented by any of the following structural formulae (2-1) to (2-8) is preferable of the examples of the photopolymerization initiator (D) because the effect of providing excellent adhesiveness to the base material is particularly strong.

[Chem. 7]

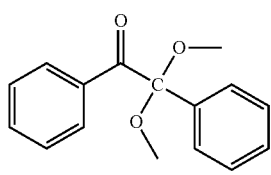
(2-1)

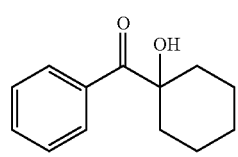
(2-2)

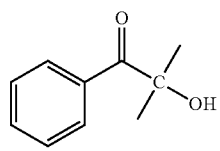
(2-3)

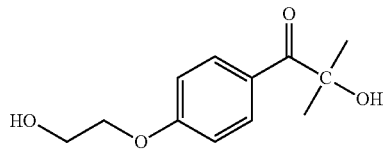
(2-4)

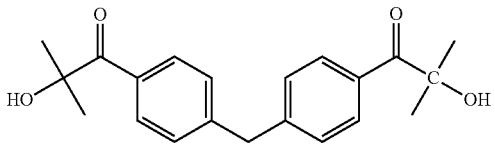
(2-5)

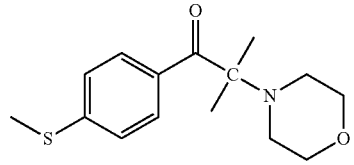
(2-6)

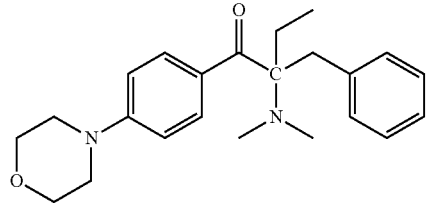
(2-7)

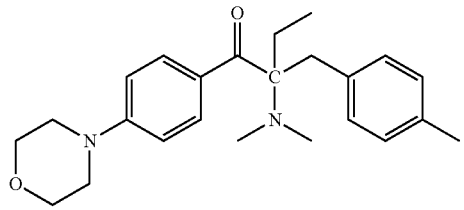
(2-8)

The active energy ray-curable resin composition of the invention may contain a photopolymerization initiator (D') other than the photopolymerization initiator (D) if desired. Examples of the other photopolymerization initiator (D') include an acetophenone compound, a benzophenone compound, a dibenzoyl compound, a benzoate ester compound and the like. When the other photopolymerization initiator (D') is used, the photopolymerization initiator (D) is preferably used in an amount of 80% by mass or more based on the total of the photopolymerization initiator (D) and the other photopolymerization initiator (D') because the effect of the invention of providing excellent adhesiveness to the base material is sufficiently exhibited.

The amount of the photopolymerization initiator (D) in the active energy ray-curable resin composition is preferably in the range of 0.05 to 10 parts by mass based on 100 parts by mass of the solid resin content of the active energy ray-curable resin composition because the effect of providing excellent adhesiveness to the base material is sufficiently exhibited.

In addition to the above components, the active energy ray-curable resin composition of the invention may contain an amino resin if necessary. When an amino resin is added, the heat resistance of the obtained cured material can be further improved.

Examples of the amino resin include methylolated amino resins which are synthesized from at least one of melamine, urea and benzoguanamine and a formaldehyde; such methylolated amino resins in which a part of or all the methylol groups have been alkyletherified with a lower monohydric alcohol such as methanol, ethanol, propanol, isopropanol, butanol or isobutanol; and the like.

Specific examples of such amino resins include Cymel 303 (manufactured by Nihon Cytec Industries Inc., methylated melamine resin), Cymel 350 (manufactured by Nihon Cytec Industries Inc., methylated melamine resin), U-Van 520 (manufactured by Mitsui Chemicals, Inc., n-butylated modified melamine resin), U-Van 20-SE-60 (manufactured by Mitsui Chemicals, Inc., n-butylated modified melamine resin), U-Van 2021 (manufactured by Mitsui Chemicals, Inc., n-butylated modified melamine resin), U-Van 220 (manufactured by Mitsui Chemicals, Inc., n-butylated modified melamine resin), U-Van 22R (manufactured by Mitsui Chemicals, Inc., n-butylated modified melamine resin), U-Van 2028 (manufactured by Mitsui Chemicals, Inc., n-butylated modified melamine resin), U-Van 165 (manufactured by Mitsui Chemicals, Inc., isobutylated modified melamine resin), U-Van 114 (manufactured by Mitsui Chemicals, Inc., isobutylated modified melamine resin), U-Van (manufactured by Mitsui Chemicals, Inc., isobutylated modified melamine resin), U-Van 60R (manufactured by Mitsui Chemicals, Inc., isobutylated modified melamine resin) and the like. When such an amino resin is used, the amino resin is preferably contained in an amount of 5 to 20 parts by mass based on 100 parts by mass of the total of the alkyd resin (A) and the unsaturated bond-containing polymerizable compound (B) in the composition.

An acid compound such as a phosphate ester may be added as a curing accelerator when the amino resin is used. The amount of the curing accelerator is preferably in the range of 0.1 to 10 parts by mass based on 100 parts by mass of the amino resin.

The active energy ray-curable resin composition of the invention may contain a solvent to dilute the resin composition and make the application easy. The solvent is not particularly limited, but a solvent with low surface tension is preferable to improve the wettability, and examples thereof include an alcohol-based solvent, a ketone-based solvent and the like. In addition to such a solvent, ethyl acetate, butyl acetate, toluene, xylene or the like can also be used in combination considering the evaporation speed, the cost and the like.

The active energy ray-curable resin composition of the invention may contain a surface regulator. The surface regulator is not particularly limited, and examples thereof include a fluorine-based additive, a cellulose-based additive and the like. The fluorine-based additive weakens the surface tension, improves the wettability and thus has the effect of preventing crawling during the application onto a base material. Specific examples of the fluorine-based additive include "MEGAFACE F-177" (manufactured by DIC Corporation) and the like.

The cellulose-based additive has the effect of imparting film-forming property during the application. The cellulose-based additive is preferably a high molecular weight additive having a number-average molecular weight of 15,000 or more to reduce the fluidity, and examples thereof include a cellulose-acetate-butyrate resin and the like.

In the invention, the adhesiveness of the deposited aluminum or the topcoat decreases when the amount of the fluorine-based additive is high, while the solid content of the composition of the invention decreases, and the adhesion of the coating becomes difficult when the amount of the cellulose-based additive is high. Thus, the fluorine-based additive and the cellulose-based additive are preferably used in combination.

With respect to the amount of the surface regulator, the total amount of the fluorine-based additive and the cellulose-based additive is preferably in the range of 0.01 to 3.0 parts by mass based on 100 parts by mass of the total of the nonvolatile components in the composition. When the fluorine-based additive is used alone, the amount is preferably in the range of 0.01 to 1.0 parts by mass. When the cellulose-based additive is used alone, the amount is preferably in the range of 0.5 to 5.0 parts by mass.

The active energy ray-curable resin composition of the invention may further contain additives such as a photosensitizer, a UV absorber, an antioxidant, a silicone-based additive, a rheology controller, a defoaming agent, an antistatic agent and a defogging agent. The amount thereof used may be in the range which sufficiently exhibits the effects of the additives and which does not inhibit curing.

The active energy ray-curable resin composition of the invention can be suitably used as an undercoat agent for a metal thin film. Conditions and the like for using the active energy-curable resin composition of the invention as an undercoat layer for forming a metal thin film layer on a base material are described in detail below.

Because the active energy ray-curable resin composition of the invention is highly adhesive to various materials, the base material is not particularly limited, and various materials can be used. Specific examples include various resin materials such as a polyethylene terephthalate (PET) resin, a polybutylene terephthalate (PBT) resin, a PET/PBT alloy resin, an unsaturated polyester resin, a polyethylene resin, a polypropylene resin, a polyphenylene sulfide (PPS) resin, a polycarbonate resin and an acrylonitrile-butadiene-styrene copolymer resin (ABS), resin materials reinforced with glass fibers, a filler or the like such as a bulk molding compound (BMC), die cast aluminum (ALD) and the like.

When the undercoat layer is formed, the active energy ray-curable resin composition of the invention is applied onto the base material by a method such as spray coating, dip coating, spin coating, flow coating or roller coating. The coating amount is an amount which results in a thickness after curing preferably in the range of 5 to 60 µm, more preferably in the range of 10 to 40 µm. The thickness of the cured coating is preferably in the range in view of the adhesion effect and the curability of the coating.

After applying the active energy ray-curable resin composition onto the base material by the method, the resin composition is preheated under a temperature condition in the range of 50 to 150° C. for 5 to 25 minutes for the purpose of volatilizing the organic solvent in the resin composition.

After the preheating step, the resin composition is cured by applying an active energy ray, and the undercoat layer is thus formed. Examples of the active energy ray used in the invention include ultraviolet rays and electron beams. When the resin composition is cured by ultraviolet rays, an ultraviolet irradiator having a xenon lamp, a high-pressure mercury lamp or a metal halide lamp as the light source can be used, and the intensity of radiation, the position of the light source or the like is adjusted if necessary. In the invention, it is preferable to apply ultraviolet rays in a manner that the integral dose becomes 50 to 5,000 mJ/cm$^2$, and it is more preferable to apply ultraviolet rays in a manner that the integral dose becomes 500 to 2,000 mJ/cm$^2$.

On the base material on which the undercoat layer of the invention has been formed in the above manner, a metal thin film layer is formed, and then a topcoat layer or the like is further formed. Examples of the metal kind of the metal thin film include aluminum, iron, nickel, chromium, copper, silver, zinc, tin, indium, magnesium, oxides thereof, alloys thereof and the like. The thickness of the metal thin film layer is preferably in the range of 30 nm to 3 μm. Clear paint such as acrylic lacquer paint, acryl-melamine curable paint and aluminum-chelating type acrylic paint is generally used for the topcoat layer, and the thickness of the topcoat layer after curing is preferably in the range of 3 to 40 μm. A formed material obtained in this manner is a reflex mirror of an automobile or the like. When the active energy ray-curable resin composition of the invention is used for the undercoat layer of the metal thin film layer, a formed material which has the metal layer with excellent metallic luster and excellent heat resistance and which is excellently adhesive to the base material can be obtained. Moreover, the active energy ray-curable resin composition of the invention also has characteristics of excellent storage stability.

EXAMPLES

The invention is explained in further detail below referring to specific Synthesis Examples and Examples. The "parts" and "%" below are by mass unless otherwise noted.

The number-average molecular weights (Mn), the weight-average molecular weights (Mw) and the molecular weight distributions (Mw/Mn) of the Examples of the present application were measured by gel permeation chromatography (GPC) under the following conditions.

Measurement Device: HLC-8320GPC manufactured by Tosoh Corporation

Columns: TSKgel 4000HXL, TSKgel 3000HXL, TSKgel 2000HXL and TSKgel 1000HXL manufactured by Tosoh Corporation Detector: RI (differential refractometer)

Data Processing: multi-station GPC-8020 model II manufactured by Tosoh Corporation Measurement Conditions: column temperature of 40° C., tetrahydrofuran as solvent and flow rate of 0.35 ml/minute Standard: monodisperse polystyrene Sample: prepared by filtering a 0.2% (in terms of solid resin content) tetrahydrofuran solution through a microfilter (100 μl)

Production Example 1: Production of Acryl-Modified Alkyd Resin (A-1)

Into a flask equipped with a stirrer, a temperature sensor and a rectifying tube, 760 parts by weight of dehydrated castor oil, 150 parts by weight of pentaerythritol, 140 parts by weight of trimethylolpropane, 345 parts by weight of phthalic anhydride and 10 parts by weight of maleic anhydride were put. The mixture was heated to 210 to 230° C. under stirring while dry nitrogen was allowed to flow in the flask, and dehydration condensation reaction was thus conducted. The reaction was terminated when the acid value reached 10.0 mg KOH/g, and the resultant was cooled to 150° C. Then, butyl acetate was added dropwise to dilute the resultant to a solid content of 70%. An alkyd resin intermediate (a-1) was thus obtained.

Into a flask equipped with a stirrer, a temperature sensor, a condenser and a dropping funnel, 326 parts by weight of butyl acetate and 714 parts by weight (solid content) of the alkyd resin intermediate (a-1) were put. The mixture was heated to 80 to 90° C. under stirring while dry nitrogen was allowed to flow in the flask. Into the dropping funnel, 180 parts by weight of methyl methacrylate, 50 parts by weight of 2-hydroxyethyl methacrylate, 70 parts by weight of styrene and 10 parts by weight of t-butyl peroxy-2-ethylhexanoate were put, and the mixture was added dropwise over four hours. Acrylic polymerization reaction was further continued for four hours at 80 to 90° C., and butyl acetate was added dropwise to dilute the resultant to a solid content of 60% by mass. An alkyd resin (A-1) solution was thus obtained. The alkyd resin (A-1) had a number-average molecular weight (Mn) of 4,000, a weight-average molecular weight (Mw) of 28,200, a molecular weight distribution (Mw/Mn) of 7.1, a hydroxyl value of 115 mg KOH/g, an acid value of 6.7 mg KOH/g and an oil length of 42.

Production Example 2: Production of Alkyd Resin (A-2)

Into a flask equipped with a stirrer, a temperature sensor, a rectifying tube and a decanter, 380 parts by weight of soybean oil, 890 parts by weight of safflower oil, 154 parts by weight of para-tertiary-butylbenzoic acid, 472 parts by weight of pentaerythritol, 754 parts by weight of phthalic anhydride and 56 parts by weight of xylene were put. The mixture was heated to 220 to 240° C. under stirring while dry nitrogen was allowed to flow in the flask, and dehydration condensation reaction was thus conducted. The reaction was terminated when the acid value became 12 mg KOH/g or less, and the resultant was cooled to 150° C. Then, toluene and ethyl acetate were added dropwise to dilute the resultant to a solid content of 50% by mass. An alkyd resin (A-2) solution was thus obtained. The alkyd resin (A-2) had a number-average molecular weight (Mn) of 3,800, a weight-average molecular weight (Mw) of 336,200, a molecular weight distribution (Mw/Mn) of 88.5, a hydroxyl value of 55 mg KOH/g, an acid value of 9.2 mg KOH/g and an oil length of 50.

Production Example 3: Production of Alkyd Resin (A-3)

Into a flask equipped with a stirrer, a temperature sensor, a rectifying tube and a decanter, 600 parts by weight of linseed oil, 300 parts by weight of soybean oil fatty acid, 53 parts by weight of para-tertiary-butylbenzoic acid, 200 parts by weight of pentaerythritol, 38 parts by weight of dipropylene glycol, 150 parts by weight of glycerin, 570 parts by weight of phthalic anhydride and 71 parts by weight of xylene were put. The mixture was heated to 230 to 250° C. under stirring while dry nitrogen was allowed to flow in the flask, and dehydration condensation reaction was thus conducted. The reaction was terminated when the acid value reached 8.3 mg KOH/g, and the resultant was cooled to 150° C. Then, toluene and ethyl acetate were added dropwise to dilute the resultant to a solid content of 70% by mass. An alkyd resin (A-3) solution was thus obtained. The alkyd resin (A-3) had a number-average molecular weight (Mn) of 3,400, a weight-average molecular weight (Mw) of 90,000, a molecular weight distribution (Mw/Mn) of 26.5, a hydroxyl value of 85 mg KOH/g, an acid value of 9.3 mg KOH/g and an oil length of 50.

Production Example 4: Production of Alkyd Resin (A-4)

Into a flask equipped with a stirrer, a temperature sensor, a rectifying tube and a decanter, 1750 parts by weight of linseed oil, 100 parts by weight of soybean oil, 430 parts by weight of benzoic acid, 820 parts by weight of pentaerythritol, 1240 parts by weight of phthalic anhydride and 130 parts by weight of xylene were put. The mixture was heated to 230 to 250° C. under stirring while dry nitrogen was allowed to flow in the flask, and dehydration condensation reaction was thus conducted. The reaction was terminated when the acid value reached 10.0 mg KOH/g, and the resultant was cooled to 150° C. Then, toluene and ethyl acetate were added dropwise to dilute the resultant to a solid content of 50% by mass. An alkyd resin (A-4) solution was thus obtained. The alkyd resin (A-4) had a number-average molecular weight (Mn) of 3,300, a weight-average molecular weight (Mw) of 433,200, a molecular weight distribution (Mw/Mn) of 131.3, a hydroxyl value of 59 mg KOH/g, an acid value of 10.1 mg KOH/g and an oil length of 45.

Production Example 5: Production of Alkyd Resin (A-5)

Into a flask equipped with a stirrer, a temperature sensor, a rectifying tube and a decanter, 1269 parts by weight of linseed oil, 593 parts by weight of pentaerythritol and 880 parts by weight of phthalic anhydride were put. The mixture was heated to 230 to 250° C. under stirring while dry nitrogen was allowed to flow in the flask, and dehydration condensation reaction was thus conducted. The reaction was terminated when the acid value reached 8.0 mg KOH/g, and the resultant was cooled to 150° C. Then, toluene was added dropwise to dilute the resultant to a solid content of 55% by mass. An alkyd resin (A-5) solution was thus obtained. The alkyd resin (A-5) had a number-average molecular weight (Mn) of 3,200, a weight-average molecular weight (Mw) of 300,000, a molecular weight distribution (Mw/Mn) of 93.8, a hydroxyl value of 80 mg KOH/g, an acid value of 4.4 mg KOH/g and an oil length of 45.

Production Example 6: Production of Alkyd Resin (A-6)

Into a flask equipped with a stirrer, a temperature sensor, a rectifying tube and a decanter, 564 parts by weight of soybean oil, 110 parts by weight of glycerin, 22 parts by weight of pentaerythritol, 0.008% sodium formate and 0.02% triphenylphosphine were supplied, and the mixture was reacted at 250° C. for two hours. The resultant was cooled to 100° C., and 262 parts by weight of phthalic anhydride, 43 parts by weight of tall rosin and 40 parts by weight of xylene were put, and dehydration condensation reaction was conducted for four hours at 200 to 220° C. under stirring while dry nitrogen was allowed to flow in the flask. The resultant was cooled to 150° C., and xylene was evaporated under reduced pressure conditions. An alkyd resin intermediate (a-6) was thus obtained.

Into a flask equipped with a stirrer, a temperature sensor, a condenser and a dropping funnel, 200 parts by weight of xylene, 300 parts by weight of the alkyd resin intermediate (a-6) and 0.21 parts by weight of isophorone diisocyanate were put, and the mixture was reacted for two hours at 80 to 90° C. under stirring while dry nitrogen was allowed to flow in the flask. An alkyd resin (A-6) solution having a solid content of 60% by mass was thus obtained. The alkyd resin (A-6) had a number-average molecular weight (Mn) of 2,700, a weight-average molecular weight (Mw) of 76,400, a molecular weight distribution (Mw/Mn) of 28.3, a hydroxyl value of 38 mg KOH/g and an acid value of 5.1 mg KOH/g, and the oil length of the alkyd resin part was 60.

In addition to the compounds obtained in the Production Examples, details of the compounds used in the Examples of the application are as follows.

unsaturated bond-containing polymerizable compound (B-1): a mixture of pentaerythritol triacrylate and tetraacrylate ("Aronix M-305" manufactured by Toagosei Co., Ltd.)

unsaturated bond-containing polymerizable compound (B-2): dipentaerythritol hexaacrylate (DPHA) ("Aronix M-402" manufactured by Toagosei Co., Ltd.)

unsaturated bond-containing polymerizable compound (B-3): trimethylolpropanetriacrylate (TMPTA) ("Aronix M-309" manufactured by Toagosei Co., Ltd.)

unsaturated bond-containing polymerizable compound (B-4): tripropylene glycol diacrylate (TPGDA) ("Kayarad TPGDA" manufactured by Nippon Kayaku Co., Ltd.)

unsaturated bond-containing polymerizable compound (B-5): 1,6-hexanediol diacrylate (HDDA) ("Viscoat #230" manufactured by Osaka Organic Chemical Industry Ltd.)

phenolic compound (C-1): para-methoxyphenol ("Methoquinone" manufactured by Seiko Chemical Co., Ltd.)

phenolic compound (C-2): tertiarybutylhydroquinone ("TBT" manufactured by Seiko Chemical Co., Ltd.)

phenolic compound (C-3): methylhydroquinone ("MH" manufactured by Seiko Chemical Co., Ltd.)

phenolic compound (C'-1): 2,6-di-tertiarybutyl-4-methylphenol ("BHT Swanox" manufactured by Seiko Chemical Co., Ltd.)

photopolymerization initiator (D-1): the compound represented by the structural formula (2-2), "IRGACURE 184" manufactured by BASF Japan Ltd.

photopolymerization initiator (D-2): the compound represented by the structural formula (2-1), "IRGACURE 651" manufactured by BASF Japan Ltd.

photopolymerization initiator (D-3): the compound represented by the structural formula (2-6), "IRGACURE 907" manufactured by BASF Japan Ltd.

photopolymerization initiator (D'-1): benzophenone photopolymerization initiator (D'-2): isoamyl dimethylamino benzoate surface modifier: "MEGAFACE F-477" manufactured by DIC Corporation Examples 1 to 12 and Comparative Examples 1 to 6

Active energy ray-curable resin compositions were produced by mixing the components in the proportions shown in Tableland evaluated by the following procedures. The results are shown in Tables 1 to 3.

Production of Reflector

An active energy ray-curable resin composition obtained above was applied onto a plastic base material by air spraying. After removing the solvent by drying at 80° C. for 10 minutes, ultraviolet rays were applied with a high-pressure mercury lamp of 80 W/cm, and an undercoat layer was thus formed. Next, a deposited aluminum layer was formed on the surface of the undercoat layer using a vacuum deposition device, and a reflector was thus produced. The dose of ultraviolet rays and the thickness of the undercoat layer were changed as shown in Tables 1 to 3. The three kinds of base material below were used, and the obtained reflectors were named reflectors 1 to 3.

Reflector 1: BMC (bulk molding compound) was used as the base material.

Reflector 2: PPS (polyphenylene sulfide) was used as the base material.

Reflector 3: PC (polycarbonate) was used as the base material.

Evaluation of Adhesiveness to Base Material

A cut of a grid of 10×10 squares at intervals of 1 mm was made on the deposit layer side of each of reflectors 1 to 3 using a utility knife, and 100 squares each having a size of 1 mm² were formed. Cellophane tape was attached onto the grid and removed rapidly. The number of squares which were not removed and which remained was counted. The evaluation was made by the following criteria.

"A": The number of remaining squares was 100.
"B": The number of remaining squares was 50 to 99.
"C": The number of remaining squares was 49 or less.

Evaluation of Heat Resistance (Appearance)

Reflector 1 was left in a hot-air dryer at 220° C. for 100 hours, and the appearance was then visually evaluated. The evaluation was made by the following criteria.

"A": No change was found.
"B": Defects of the appearance such as "whitening", "rainbow", "cracks" or "blisters" were observed in a part of the reflector.
"C": Defects of the appearance such as "whitening", "rainbow", "cracks" and "blisters" were observed in the entire reflector.

Evaluation of Heat Resistance (Adhesiveness)

Using reflector 1 which was left in a hot-air dryer at 220° C. for 100 hours, testing and evaluation were conducted by the same method as that for the evaluation of the adhesiveness to the base material.

TABLE 1

|  | Example 1 | Example 2 | Example 3 | Example 4 | Example 5 | Example 6 |
|---|---|---|---|---|---|---|
| Alkyd resin (A-1) [parts by weight (solid content)] | 50 | | | | | |
| Alkyd resin (A-2) [parts by weight (solid content)] | | 50 | | | | |
| Alkyd resin (A-3) [parts by weight (solid content)] | | | 50 | 50 | | |
| Alkyd resin (A-4) [parts by weight (solid content)] | | | | | 50 | 50 |
| Unsaturated bond-containing polymerizable compound (B-1) [parts by weight] | 10 | 10 | 20 | 20 | 15 | 15 |
| Unsaturated bond-containing polymerizable compound (B-2) [parts by weight] | | | | | | |
| Unsaturated bond-containing polymerizable compound (B-3) [parts by weight] | 10 | 10 | | | 5 | 5 |
| Unsaturated bond-containing polymerizable compound (B-4) [parts by weight] | 20 | 20 | 20 | 20 | 20 | 20 |
| Unsaturated bond-containing polymerizable compound (B-5) [parts by weight] | 10 | 10 | 10 | 10 | 10 | 10 |
| Phenolic compound (C-1) [parts by weight] | 0.03 | | | | 0.01 | 0.03 |
| Phenolic compound (C-2) [parts by weight] | | 0.03 | | | | |
| Phenolic compound (C-3) [parts by weight] | | | 0.03 | | | |
| Phenolic compound (C-4) [parts by weight] | | | | 0.03 | 0.02 | |
| Photopolymerization initiator (D-1) [parts by weight] | 3 | 2 | 2 | 3 | 3 | 3 |
| Photopolymerization initiator (D-2) [parts by weight] | | 1 | | | | |
| Photopolymerization initiator (D-3) [parts by weight] | | | | 1 | | |
| Surface modifier [parts by weight] | 0.1 | 0.1 | 0.1 | 0.1 | 0.1 | 0.1 |
| Ethyl acetate [parts by weight] | 120 | 120 | 120 | 120 | 120 | 120 |
| Methyl isobutyl ketone [parts by weight] | 120 | 120 | 120 | 120 | 120 | 120 |
| Acrylate concentration of solid part [mmol/g] | 4.1 | 4.1 | 4.3 | 4.3 | 4.2 | 4.2 |
| Nonvolatile content [mass %] | 30 | 30 | 30 | 30 | 30 | 30 |
| Thickness of undercoat layer [μm] | 20 | 20 | 20 | 20 | 20 | 20 |
| Integral dose of UV rays [mJ/cm²] | 1000 | 1000 | 1000 | 1000 | 1000 | 1000 |
| Evaluation of adhesiveness to base material [Test piece 1] | A | A | B | A | A | A |
| Evaluation of adhesiveness to base material [Test piece 2] | A | A | A | A | A | A |
| Evaluation of adhesiveness to base material [Test piece 3] | A | A | A | A | A | A |
| Evaluation of heat resistance (appearance) | B | A | A | A | A | A |
| Evaluation of heat resistance (adhesiveness) | A | A | B | B | A | A |

TABLE 2

|  | Example 7 | Example 8 | Example 9 | Example 10 | Example 11 | Example 12 |
|---|---|---|---|---|---|---|
| Alkyd resin (A-4) [parts by weight (solid content)] | | | 50 | 50 | 50 | 50 |
| Alkyd resin (A-5) [parts by weight (solid content)] | 50 | | | | | |
| Alkyd resin (A-6) [parts by weight (solid content)] | | 60 | | | | |
| Unsaturated bond-containing polymerizable compound (B-1) [parts by weight] | | | 15 | 15 | 15 | 15 |
| Unsaturated bond-containing polymerizable compound (B-2) [parts by weight] | 50 | 20 | | | | |

TABLE 2-continued

|  | Example 7 | Example 8 | Example 9 | Example 10 | Example 11 | Example 12 |
|---|---|---|---|---|---|---|
| Unsaturated bond-containing polymerizable compound (B-3) [parts by weight] |  | 20 | 5 | 5 | 5 | 5 |
| Unsaturated bond-containing polymerizable compound (B-4) [parts by weight] |  |  | 20 | 20 | 20 | 20 |
| Unsaturated bond-containing polymerizable compound (B-5) [parts by weight] |  |  | 10 | 10 | 10 | 10 |
| Phenolic compound (C-1) [parts by weight] | 0.03 | 0.03 | 0.03 | 0.03 | 0.1 | 0.01 |
| Phenolic compound (C'-1) [parts by weight] |  |  |  |  |  | 0.1 |
| Photopolymerization initiator (D-1) [parts by weight] | 3 | 3 | 3 | 3 | 3 | 3 |
| Surface modifier [parts by weight] | 0.1 | 0.1 | 0.1 | 0.1 | 0.1 | 0.1 |
| Ethyl acetate [parts by weight] | 120 | 120 | 120 | 120 | 120 | 120 |
| Methyl isobutyl ketone [parts by weight] | 120 | 120 | 120 | 120 | 120 | 120 |
| Acrylate concentration of solid part [mmol/g] | 5.0 | 3.7 | 4.2 | 4.2 | 4.2 | 4.2 |
| Nonvolatile content [mass %] | 30 | 30 | 30 | 30 | 30 | 30 |
| Thickness of undercoat layer [µm] | 20 | 20 | 40 | 10 | 20 | 20 |
| Integral dose of UV rays [mJ/cm$^2$] | 1000 | 1000 | 500 | 3000 | 1000 | 1000 |
| Evaluation of adhesiveness to base material [Test piece 1] | A | A | A | A | A | A |
| Evaluation of adhesiveness to base material [Test piece 2] | B | B | A | A | A | A |
| Evaluation of adhesiveness to base material [Test piece 3] | A | A | A | A | A | A |
| Evaluation of heat resistance (appearance) | A | A | A | A | A | A |
| Evaluation of heat resistance (adhesiveness) | B | A | A | A | A | A |

TABLE 3

|  | Comparative Example 1 | Comparative Example 2 | Comparative Example 3 | Comparative Example 4 |
|---|---|---|---|---|
| Alkyd resin (A-4) [parts by weight (solid content)] |  |  | 50 | 50 |
| Alkyd resin (A-5) [parts by weight (solid content)] |  | 50 |  |  |
| Alkyd resin (A-6) [parts by weight (solid content)] | 60 |  |  |  |
| Unsaturated bond-containing polymerizable compound (B-1) [parts by weight] |  |  | 15 | 15 |
| Unsaturated bond-containing polymerizable compound (B-2) [parts by weight] | 20 | 50 |  |  |
| Unsaturated bond-containing polymerizable compound (B-3) [parts by weight] | 20 |  | 5 | 5 |
| Unsaturated bond-containing polymerizable compound (B-4) [parts by weight] |  |  | 20 | 20 |
| Unsaturated bond-containing polymerizable compound (B-5) [parts by weight] |  |  | 10 | 10 |
| Phenolic compound (C-1) [parts by weight] | 0.2 |  |  |  |
| Phenolic compound (C'-1) [parts by weight] |  | 0.03 | 0.03 | 0.03 |
| Photopolymerization initiator (D-1) [parts by weight] |  | 3 |  | 3 |
| Photopolymerization initiator (D'-1) [parts by weight] | 2 |  | 3 |  |
| Photopolymerization initiator (D'-2) [parts by weight] | 2 |  |  |  |
| Surface modifier [parts by weight] | 0.1 | 0.1 | 0.1 | 0.1 |
| Ethyl acetate [parts by weight] | 120 | 120 | 120 | 120 |
| Methyl isobutyl ketone [parts by weight] | 120 | 120 | 120 | 120 |
| Acrylate concentration of solid part [mmol/g] | 3.7 | 5.0 | 4.2 | 4.2 |
| Nonvolatile content [mass %] | 30 | 30 | 30 | 30 |
| Thickness of undercoat layer [µm] | 20 | 20 | 20 | 20 |
| Integral dose of UV rays [mJ/cm$^2$] | 1000 | 1000 | 1000 | 1000 |
| Evaluation of adhesiveness to base material [Test piece 1] | B | A | C | B |
| Evaluation of adhesiveness to base material [Test piece 2] | C | C | C | B |
| Evaluation of adhesiveness to base material [Test piece 3] | A | A | A | A |
| Evaluation of heat resistance (appearance) | C | B | B | A |
| Evaluation of heat resistance (adhesiveness) | C | C | C | C |

The invention claimed is:

1. An active energy ray-curable resin composition comprising as essential components:
an acryl-modified alkyd resin (A) obtainable by modifying oil-modified alkyd resin with a hydroxyl group-containing (meth)acrylate monomer having a weight-average molecular weight (Mw) of 50,000 to 700,000;
a (meth)acrylate monomer (B);
a phenolic compound (C) represented by the following structural formula (1)

[Chem. 1]

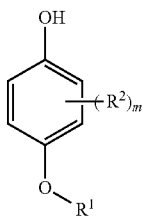

(1)

wherein $R^1$ is a hydrogen atom or a hydrocarbon group, $R^2$'s each independently represent a hydrocarbon group, an alkoxy group or a halogen atom, and m is 0 or an integer of 1 to 4); and a photopolymerization initiator (D) having a structural moiety represented by the following structural formula (2)

[Chem. 2]

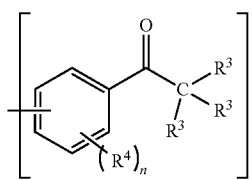

(2)

wherein $R^3$'s are any of an aliphatic hydrocarbon group, an aryl group, an aralkyl group, an alkoxy group, a hydroxyl group and an amino group, wherein two or more of the $R^3$'s may form a ring structure, $R^4$'s each independently represent a hydrocarbon group, an alkoxy group or a halogen atom, and n is 0 or an integer of 1 to 5;

wherein the total amount of the acryl-modified alkyd resin (A) and the (meth)acrylate monomer (B) is 80 parts by mass or more with respect to 100 parts by mass of a total solid resin content, and the mass ratio of the acryl-modified alkyd resin (A) and the (meth)acrylate monomer (B) [(A)/(B)] is 50/50 to 80/20.

2. An undercoat agent for a metal thin film, comprising the active energy ray-curable resin composition according to claim 1.

3. A coating comprising a product made from the undercoat agent for a metal thin film according to claim 2.

4. A formed material comprising an undercoat layer comprising a product made from the undercoat agent for a metal thin film according to claim 2.

5. The active energy ray-curable resin composition according to claim 1, wherein the (meth)acrylate monomer (B) is one or more selected from (poly)ethylene glycol di(meth)acrylate, (poly)propylene glycol di(meth)acrylate, butanediol di(meth)acrylate, hexanediol di(meth)acrylate, neopentyl glycol di(meth)acrylate, trimethylolpropane tri(meth)acrylate, glycerin tri(meth)acrylate, pentaerythritol tri(meth)acrylate, ditrimethylolpropane tri(meth)acrylate, dipentaerythritol tri(meth)acrylate, pentaerythritol tetra(meth)acrylate, ditrimethylolpropane tetra(meth)acrylate, dipentaerythritol hexa(meth)acrylate, dipentaerythritol tetra(meth)acrylate and dipentaerythritol penta(meth)acrylate.

6. The active energy ray-curable resin composition according to claim 1 consisting essentially of the alkyd resin (A), the (meth)acrylate monomer (B), the phenolic compound (C), the photopolymerization initiator (D) and a solvent.

* * * * *